US008585159B2

(12) United States Patent
Muskopf

(10) Patent No.: US 8,585,159 B2
(45) Date of Patent: Nov. 19, 2013

(54) ELECTRONIC MEDIA STORAGE APPARATUS

(76) Inventor: Thomas Omer Muskopf, Orlando, FL (US)

( * ) Notice: Subject to any disclaimer, the term of this patent is extended or adjusted under 35 U.S.C. 154(b) by 326 days.

(21) Appl. No.: 12/897,229

(22) Filed: Oct. 4, 2010

(65) Prior Publication Data

US 2011/0233082 A1   Sep. 29, 2011

Related U.S. Application Data

(60) Provisional application No. 61/317,378, filed on Mar. 25, 2010.

(51) Int. Cl.
*A47B 81/00*   (2006.01)

(52) U.S. Cl.
USPC .......................... 312/9.55; 312/9.47; 206/307

(58) Field of Classification Search
USPC ............ 312/205, 9.41, 9.43, 9.47, 9.53, 9.54, 312/9.55, 9.64, 330.1; 220/558, 559, 8, 220/200; 206/307, 307.1, 308.1, 308.2, 206/308.3, 387.1, 387.14, 387.15
See application file for complete search history.

(56) References Cited

U.S. PATENT DOCUMENTS

| | | | | |
|---|---|---|---|---|
| 382,716 A * | 5/1888 | Matthews | ...................... | 206/425 |
| 1,120,955 A * | 12/1914 | Martin | ........................... | 229/101 |
| 1,469,347 A * | 10/1923 | Westin | .......................... | 220/549 |
| 1,845,842 A * | 2/1932 | Kamenstein | .................. | 206/737 |
| 3,232,439 A * | 2/1966 | Dahl, Jr. | ........................... | 211/10 |
| 3,595,433 A * | 7/1971 | Jones et al. | .................... | 206/737 |
| 3,648,831 A * | 3/1972 | Arnone | ........................... | 206/468 |
| 4,337,861 A * | 7/1982 | Smart | .......................... | 206/579 |
| 4,856,653 A * | 8/1989 | Ackeret | ...................... | 206/387.1 |
| 5,027,950 A | 7/1991 | Gutierrez et al. | | |
| 5,201,575 A | 4/1993 | Stolzel | | |
| 5,358,321 A * | 10/1994 | Leonardi | ....................... | 312/9.55 |
| 5,415,283 A * | 5/1995 | Kim | ............................... | 206/309 |
| 5,586,650 A | 12/1996 | Yeh | | |
| 5,590,770 A | 1/1997 | Yeh | | |
| 5,873,458 A * | 2/1999 | Kao | ........................... | 206/308.1 |
| 6,109,707 A | 8/2000 | Ozaki | | |
| 6,340,086 B1 * | 1/2002 | McConnaughy et al. | . | 206/307.1 |
| 6,817,683 B2 * | 11/2004 | Woo | .............................. | 312/9.43 |
| 6,902,245 B1 * | 6/2005 | Hoeppner | ................ | 312/334.46 |
| 7,401,756 B2 * | 7/2008 | Lien et al. | ................ | 248/346.07 |

* cited by examiner

*Primary Examiner* — James O Hansen
*Assistant Examiner* — Andres F Gallego
(74) *Attorney, Agent, or Firm* — Dale J. Ream

(57) ABSTRACT

An electronic media storage apparatus includes a lower housing having a floor, opposed side walls and a rear wall. A front wall is movable between open and closed configurations. The apparatus includes a cover having a top portion and opposed first and second sides extending downwardly therefrom. The lower housing side walls, lower housing rear wall, and the front wall collectively define a continuous lip at an upper end of the lower housing and an upper end of the front wall when the front wall is at the closed configuration. The cover is removably coupled to the lower housing and the front wall. When the front wall is at the closed configuration and the cover is coupled to the lower housing and front wall, a hermetic cavity is formed between the lower housing, the front wall, and the cover; the cavity being sized to receive an electronic media item.

4 Claims, 9 Drawing Sheets

US 8,585,159 B2

ELECTRONIC MEDIA STORAGE APPARATUS

CROSS-REFERENCE TO RELATED APPLICATIONS

The present invention claims the benefit of U.S. Provisional Patent Application, Ser. No. 61/317,378, filed on Mar. 25, 2010 titled My Box.

BACKGROUND OF THE INVENTION

This invention relates generally to storage containers and, more particularly, to an electronic media storage apparatus that enables a maximum number of media items to be stored while still providing comfortable viewing or selection of respective media items.

Maximizing the storage of media items such as CD/DVD cases is very important in order to conserve space such as on a television or stereo cabinet, desk, or similar location. Ideally, media items are positioned tightly adjacent one another to make complete use of available space such as in a basket, box, or similar storage container. Although assumably effective to store a plurality of media items, the existing products or prior patent proposals do not enable a user to see or read the title of the media item when multiple media items are sandwiched tightly against each other. In other words, the goals of (1) positioning a maximum number of media items in a basket, box, or similar container and (2) being able to visually perceive the title or image on each media item without removing the respective media item from its stored position are not currently able to be satisfied simultaneously with current products and prior patent proposals.

Therefore, it would be desirable to have an electronic media storage apparatus that enables a user, in one configuration, to tightly position multiple media items adjacent one another for storage purposes. Further, it would be desirable to have an electronic media storage apparatus that enables a user, in another configuration, to easily manipulate stored media items to visually perceive respective titles or images without having to fully remove each one. In addition, it would be desirable to have an electronic media storage apparatus having a lid configured to seal media containers from dust during storage.

SUMMARY OF THE INVENTION

An electronic media storage apparatus according to an embodiment of the present invention includes a lower housing having a floor, opposed side walls, and a rear wall. The media storage apparatus includes a front wall movable between open and closed configurations. The storage apparatus also includes a cover having a top portion, opposed first and second sides extending downwardly from the top portion, and opposed front and rear ends extending downwardly from the top portion. The lower housing side walls, lower housing rear wall, and front wall collectively define a continuous lip at an upper end of the lower housing and an upper end of the front wall when the front wall is at the closed configuration. The cover is removably coupled to the lower housing and the front wall. When the front wall is at the closed configuration and the cover is coupled to the lower housing and the front wall, a hermetic cavity is formed between the lower housing, the front wall, and the cover; the cavity being sized to receive at least one electronic media item.

Therefore, a general object of this invention is to provide an electronic media storage apparatus for storing a plurality of media items.

Another object of this invention is to provide an electronic media storage apparatus, as aforesaid, that tightly secures media containers in an enclosed environment.

Still another object of this invention is to provide an electronic media storage apparatus, as aforesaid, having a movable front wall for selectively providing enhanced space for a user to view media container titles.

A further object of this invention is to provide an electronic media storage apparatus, as aforesaid, that provides a hermetically sealed cavity so that the media containers are substantially protected from contamination.

A still further object of this invention is to provide an electronic media storage apparatus, as aforesaid, that is user-friendly to use.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 8b is a sectional view taken along line 8b-8b of FIG. 8a;

FIG. 9b is a sectional view taken along line 9b-9b of FIG. 9a; and

DESCRIPTION OF THE PREFERRED EMBODIMENT

Figure 1:
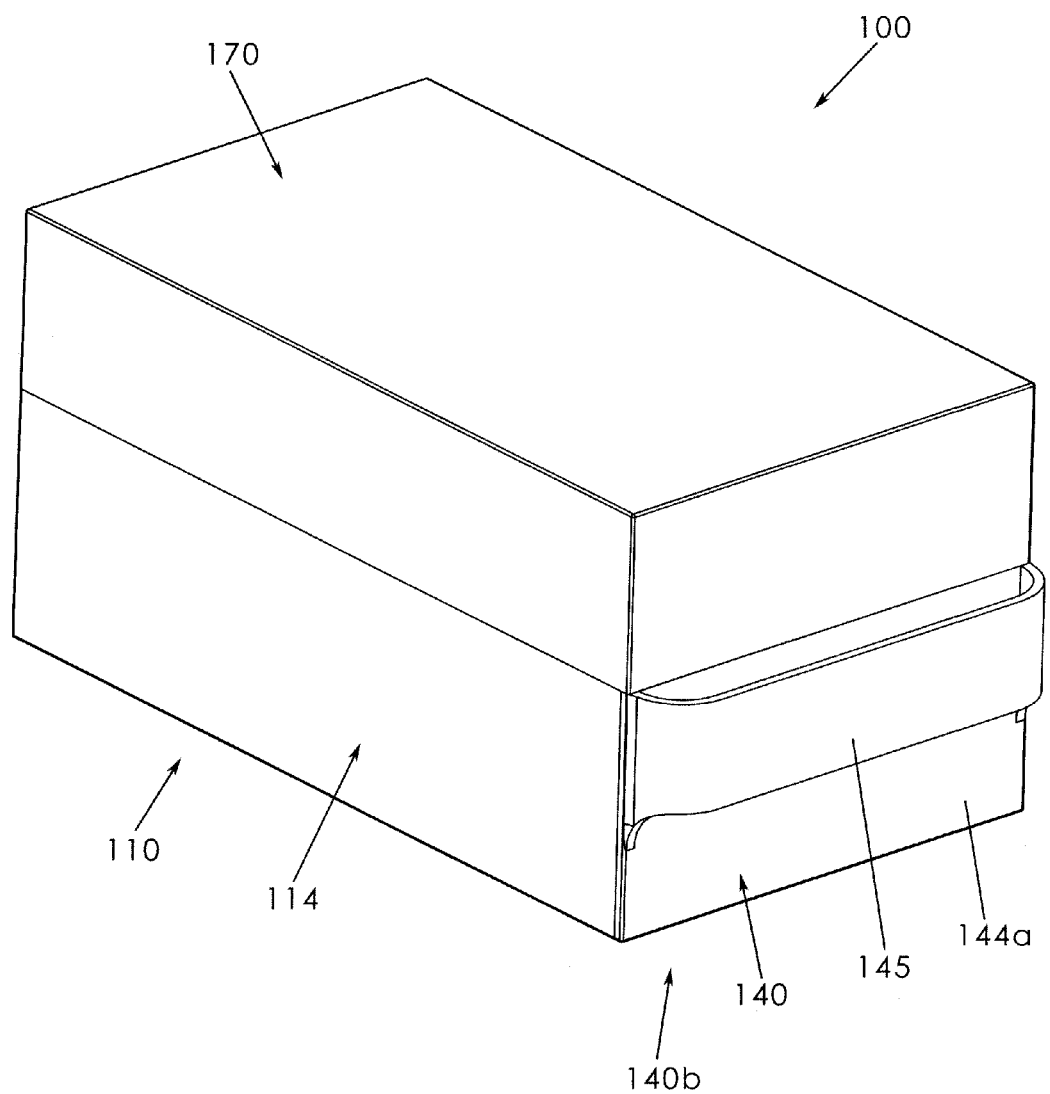
FIG. 1 is a perspective view of an electronic media storage apparatus according to a preferred embodiment of the present invention.
Figure 2:
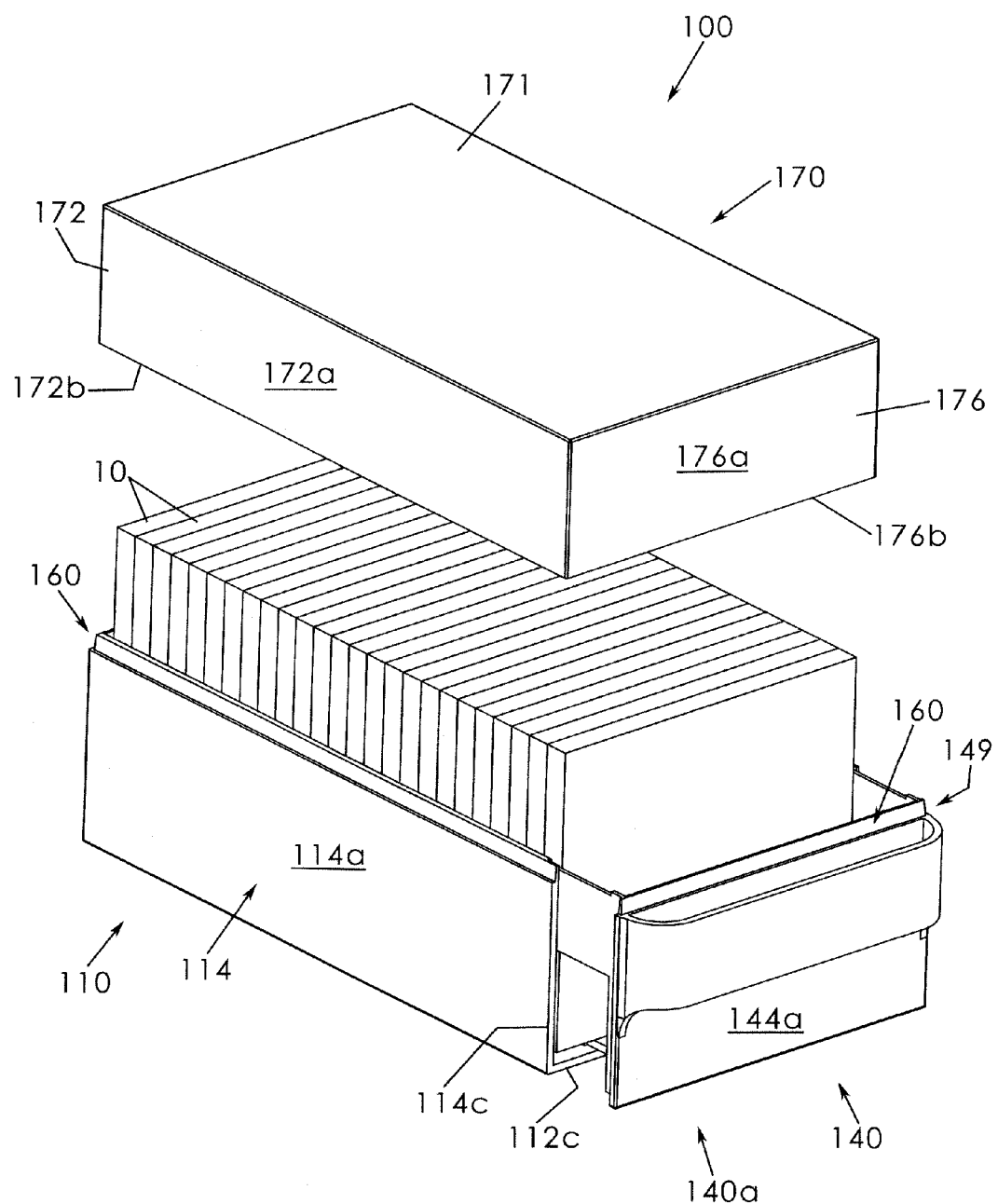
FIG. 2 is an exploded view of the storage apparatus as in FIG. 1.

An electronic media storage apparatus according to one embodiment of the present invention will now be described in detail with reference to FIGS. 1 through 4 and 9a through 9c of the accompanying drawings. More particularly, an electronic media storage apparatus 100 for use with at least one electronic media item 10 (i.e., a Compact Disc, a Digital Video Disc, a Blu-ray Disc, or other disc containing electronic media) according to one embodiment includes a lower housing 110, a front wall 140, and a cover 170.

Figure 3:
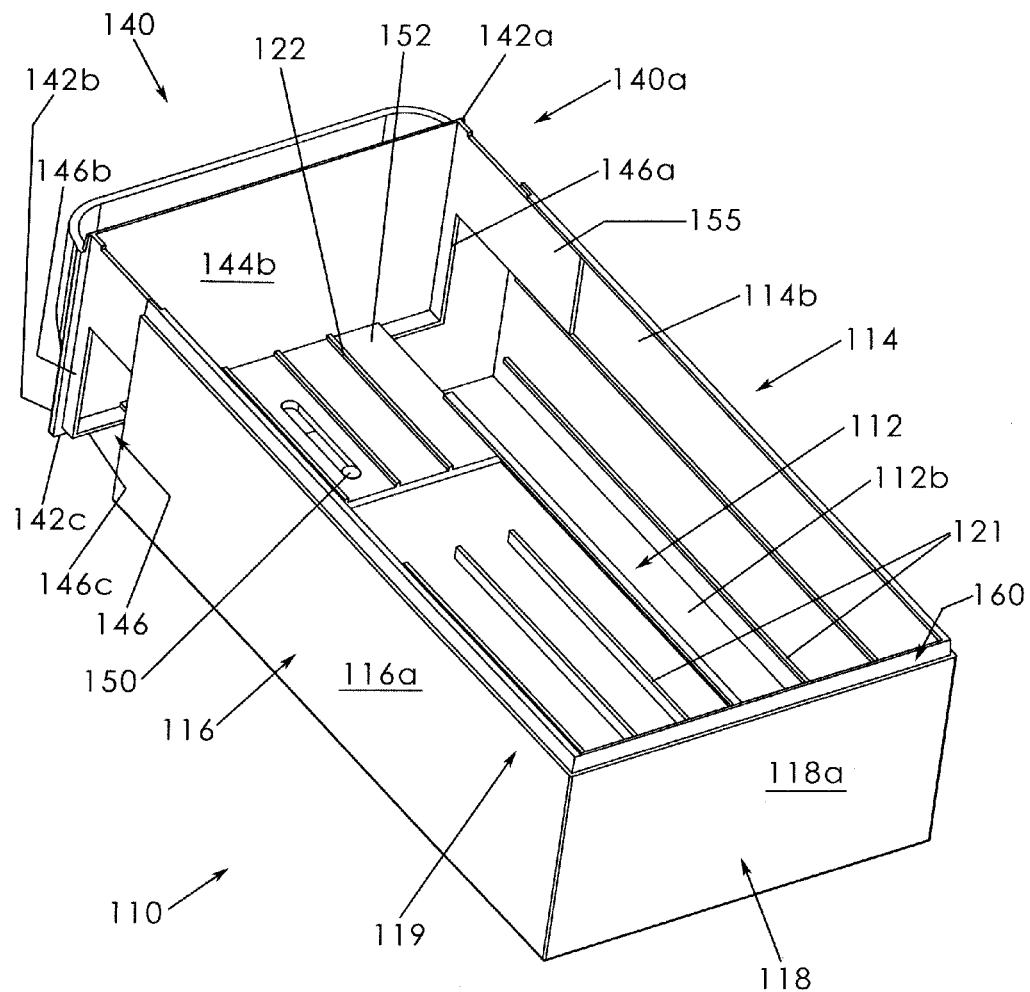
FIG. 3 is an elevated perspective view of the lower housing of the storage apparatus as in FIG. 1.
Figure 4:
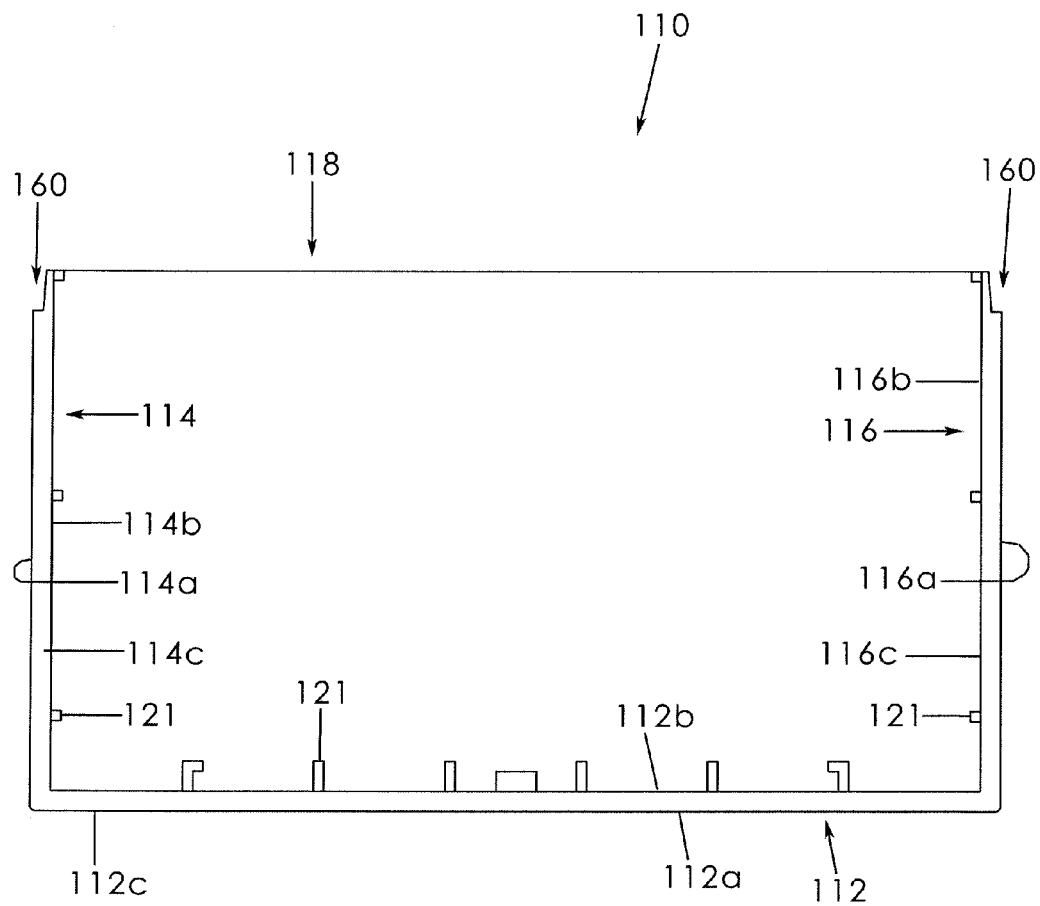
FIG. 4 is a front view of the storage apparatus as in FIG. 3.
Figure 5:
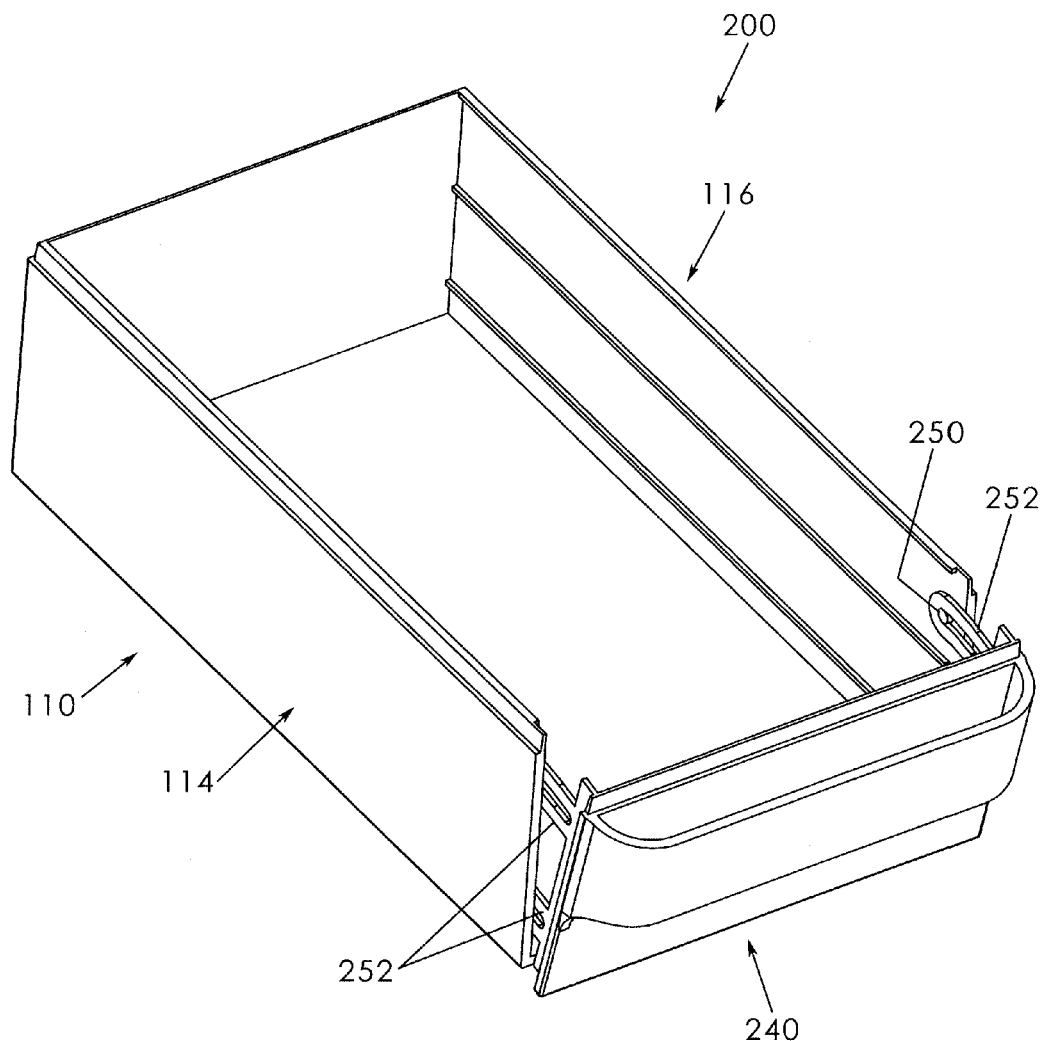
FIG. 5 is a perspective view of an electronic media storage apparatus according to another embodiment of the present invention.
Figure 6:
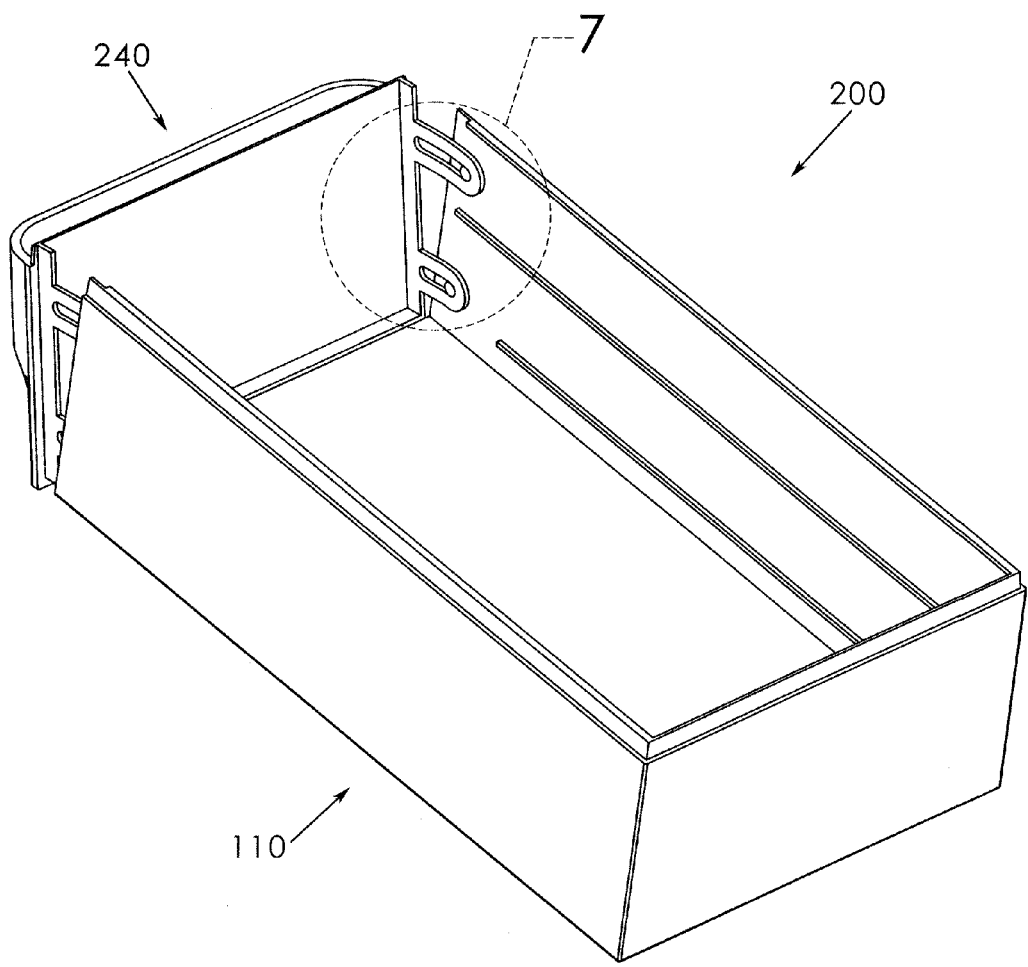
FIG. 6 is a perspective view of the storage apparatus as in FIG. 5 taken from a reverse angle.
Figure 7:
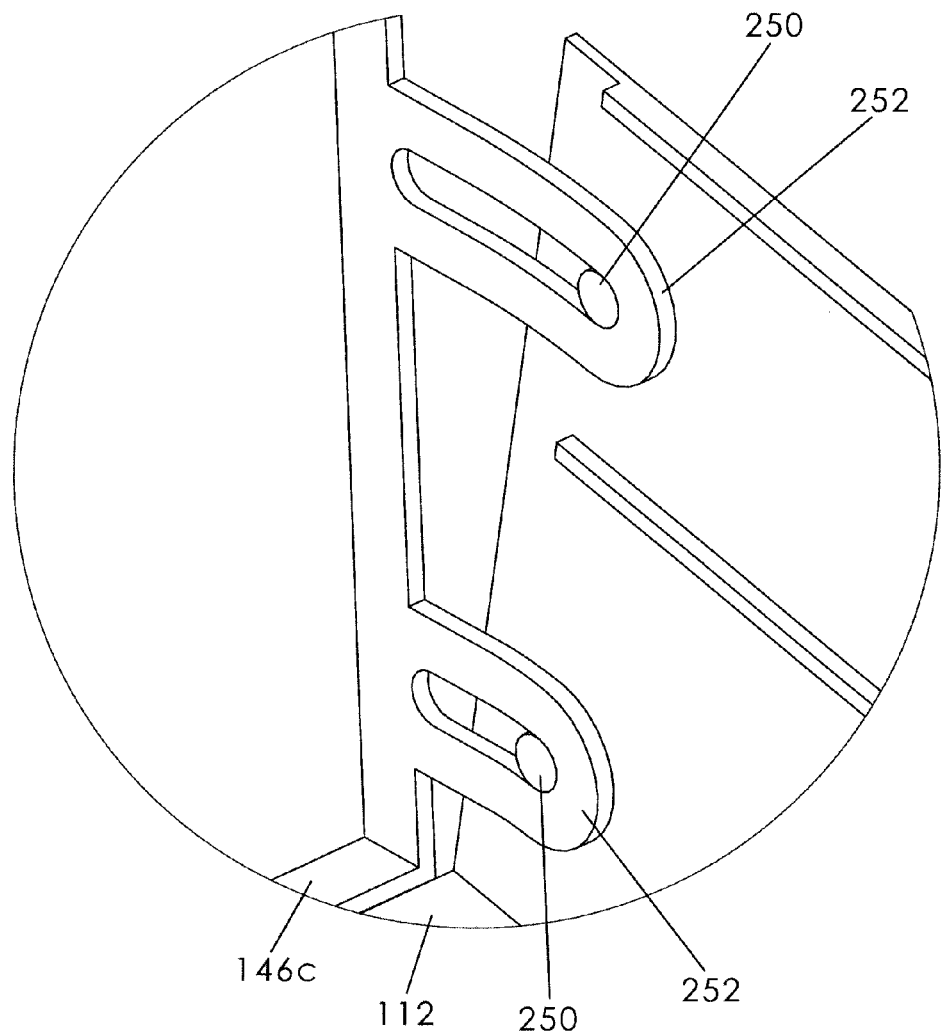
FIG. 7 is an isolated view on an enlarged scale taken from a portion of FIG. 6.
Figure 8A:
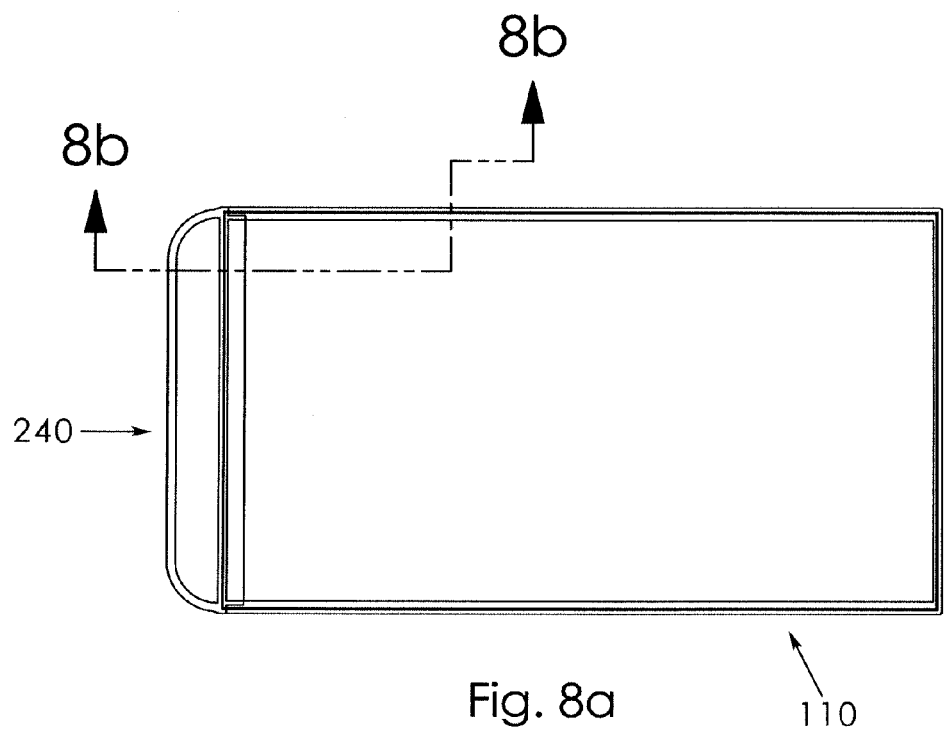
FIG. 8a is a top view of the storage apparatus as in FIG. 5.
Figure 8B:
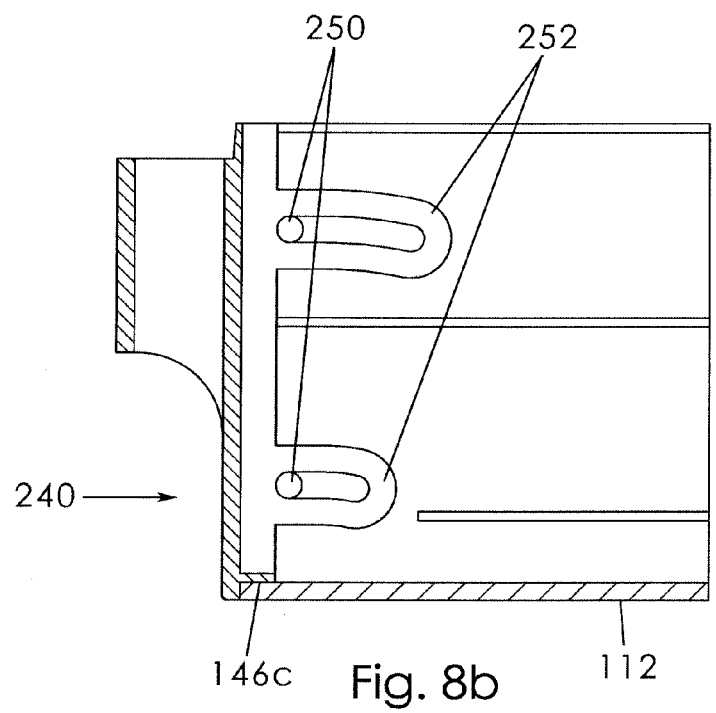

The lower housing 110 is specifically shown in FIGS. 1 through 4 and FIG. 9c and includes a floor 112, first and second opposed side walls 114, 116 extending upwardly from the floor 112, and a rear wall 118 extending upwardly from the floor 112 and connecting the side walls 114, 116. The floor 112 has a lower surface 112a, an upper surface 112b, and a front face 112c. Each side wall 114, 116 has an outer face 114a, 116a, an inner face 114b, 116b, and a front face 114c, 116c. The rear wall 118 has an outer face 118a. It may be desirable for the lower surface 112a, the outer face 114a, the outer face 116a, and the outer face 118a to each be generally planar and rectangular. The floor upper surface 112b may be generally planar (FIGS. 3 and 4), curved to receive the electronic media item(s) 10, or of other appropriate configuration. As also shown in FIGS. 3 and 4, at least one rib 121 may extend from the upper surface 112b of the floor 112, the inner face 114b of the lower housing first side wall 114, and the inner face 116b of the lower housing second side wall 116, respectively.

Figure 9A:
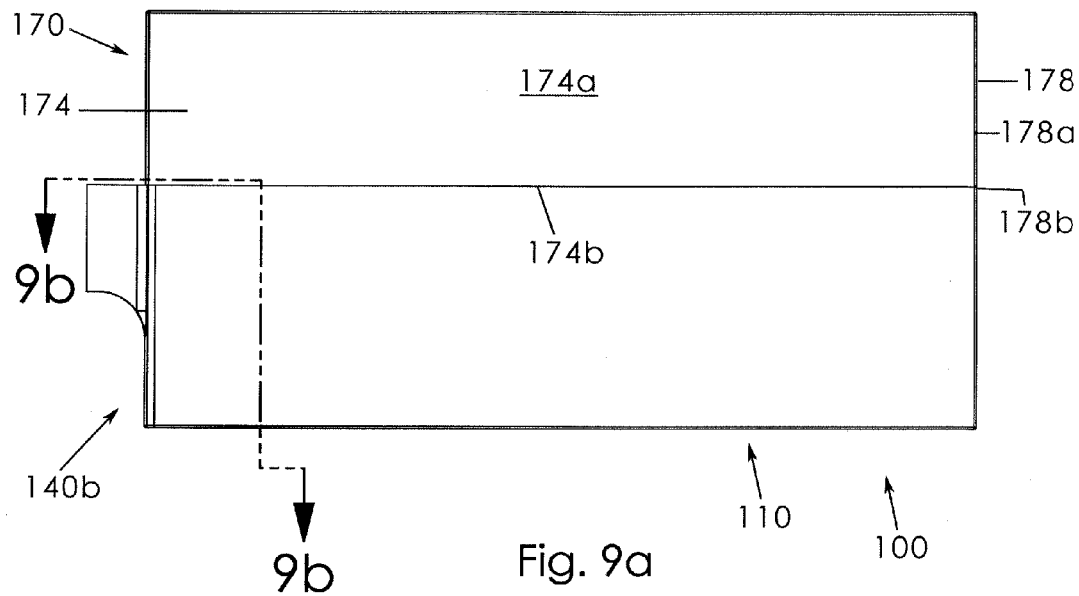
FIG. 9a is a side view of the storage apparatus as in FIG. 1.
Figure 9B:
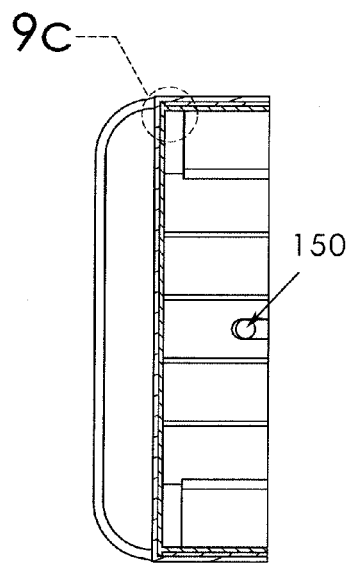
Figure 9C:
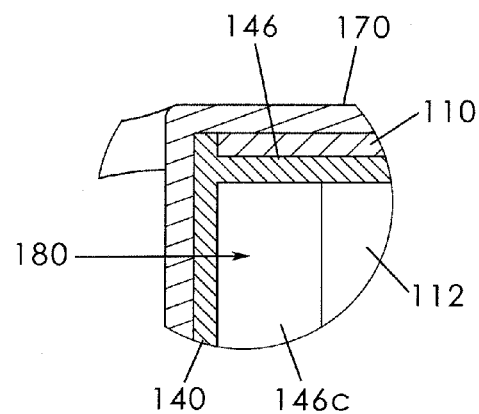
FIG. 9c is an isolated view on an enlarged scale taken from a portion of FIG. 9b.

FIGS. 1 through 3 and FIG. 9c show the front wall 140, which is movable between an open configuration 140a (FIGS. 2 and 3) and a closed configuration 140b (FIGS. 1 and 9a). The front wall 140 has first and second opposed ends 142a, 142b, a lower face 142c, and outer and inner faces 144a, 144b. A handle 145 (FIG. 1) may extend outwardly from the front wall outer face 144a, and a continuous ledge 146 (FIGS. 3 and 9c) extends from the front wall inner face 144b. Focusing on the continuous ledge 146 shown in FIGS. 3 and 9c, a first portion 146a of the ledge 146 is spaced apart from the front wall first end 142a, a second portion 146b of the ledge 146 is spaced apart from the front wall second end 142b, and a third portion 146c is spaced apart from the front wall lower face 142c.

A stop 150 is coupled to the lower housing floor 112 (FIG. 3), the lower housing first side wall 114, or the lower housing second side wall 116. A slide 152 is coupled to the front wall 140 and cooperates with the stop 150 to limit movement of the front wall 140 relative to the lower housing 110. The slide 152 defines a slot having opposed closed ends that receives and surrounds the stop 150 that extends upwardly from the housing floor 112. The slot completely prohibits the slide 152 and, therefore, the front wall 140, from being moved beyond a predetermined or removed configuration, as shown in FIG. 3. In the embodiment 100, the front wall 140 slides generally linearly relative to the lower housing 110 when moving between the open and closed configurations 140a, 140b. The slide 152 is generally coplanar with the floor upper surface 112b, at least one rib 122 extends from the slide 152 for moving an electronic media item 10 placed thereon away from the rear wall 118 when the front wall 140 moves from the closed configuration 140b to the open configuration 140a, and a guide 155 extends from the front wall 140 and interacts with one of the lower housing side walls 114, 116 to restrict the front wall 140 from rotating relative to the lower housing 110.

As will be apparent from viewing FIGS. 1 through 4, the lower housing side walls 114, 116, the lower housing rear wall 118, and the front wall 140 collectively define a continuous lip 160 at an upper end 119 of the lower housing 110 and an upper end 149 of the front wall 140 when the front wall 140 is at the closed configuration 140b. And when the front wall 140 is at the closed configuration 140b, the front wall inner face 144b abuts the floor front face 112c, the side wall front face 114c, and the side wall front face 116c. Moreover, when the front wall 140 is at the closed configuration (140b), the ledge first portion 146a abuts and extends parallel to the lower housing first wall inner face 114b; the ledge second portion 146b abuts and extends parallel to the lower housing second wall inner face 116b; and the ledge third portion 146c abuts and extends parallel to the floor upper surface 112b.

Turning to the cover 170, the cover 170 (FIGS. 1 and 2) has a top portion 171, opposed first and second sides 172, 174 (FIG. 9a) extending downwardly from the top portion 171, and opposed front and rear ends 176, 178 extending downwardly from the top portion 171 and connecting the cover sides 172, 174 (FIG. 9a). It may be desirable for the top portion 171 to be parallel to the lower surface 112a of the lower housing floor 112. The cover sides 172, 174 and the cover ends 176, 178 each have an outer face 172a, 174a, 176a, 178a and a lower face 172b, 174b, 176b, 178b. The cover 170 is removably coupled to the lower housing 110 and the front wall 140. When the front wall 140 is at the closed configuration 140b and the cover 170 is coupled to the lower housing 110 and the front wall 140, the lower faces 172b, 174b, 176b, 178b of the cover sides 172, 174 and ends 176, 178 rest upon the continuous lip 160.

When the front wall 140 is at the closed configuration 140b and the cover 170 is coupled to the lower housing 110 and the front wall 140, the outer face 172a of the cover first side 172 is generally coplanar with the outer face 114a of the lower housing first side wall 114; the outer face 174a of the cover second side 174 is generally coplanar with the outer face 116a of the lower housing second side wall 116; the outer face 178a of the cover rear end 178 is generally coplanar with the outer face 118a of the lower housing rear wall 118; and the outer face 176a of the cover front end 176 is generally coplanar with the outer face 144a of the front wall 140. Due to the interaction between the lower housing 110, the front wall 140, and the cover 170, a hermetic cavity 180 (FIG. 9c) is formed between the lower housing 110, the front wall 140, and the cover 170 when assembled.

The hermetic cavity 180 is sized to receive at least one electronic media item 10. When sized to receive a plurality of electronic media items 10, at least one divider (not shown) may be removably positioned between the side walls 114, 116 of the lower housing 110 to separate at least one of the electronic media items 10 from at least one other electronic media items 10.

In use, the electronic media item(s) 10 may be placed inside the lower housing 110, the front wall 140 may be moved to the closed configuration 140b, and the cover 170 may be attached as described above, hermetically sealing the cavity 180 (and the electronic media item(s) 10). The entire electronic media storage apparatus 100 (with the enclosed electronic media item(s) 10) may then be shipped or stored, protecting the enclosed electronic media item(s) 10 from breakage, dust, and other damage. If being shipped, it may be desirable to further secure the cover 170 to the lower housing 110 (e.g., using an adhesive tape). If being stored, the electronic media storage apparatus 100 may be easily stacked due to its configuration.

To remove the electronic media item(s) 10 from the electronic media storage apparatus 100, the cover 170 is first detached. Then the front wall 140 may be moved to the open configuration 140a. For ease of access, any electronic media item 10 on the slide 152 (and particularly on the rib 122) may be moved away from the rear wall 118 when the front wall 140 moves to the open configuration 140a.

FIGS. 5 through 8b show another electronic media storage apparatus 200 that is substantially similar to the embodiment 100, except as specifically noted and/or shown, or as would be inherent. Further, those skilled in the art will appreciate that the embodiment 100 (and thus the embodiment 200) may be modified in various ways, such as through incorporating all or part of any of the various described embodiments, for example. For uniformity and brevity, corresponding reference numbers may be used to indicate corresponding parts, though with any noted deviations.

In embodiment 200, the front wall 240 (replacing the front wall 140) rotates relative to the lower housing 110 when moving between open (FIGS. 5 through 7) and closed (FIGS. 8a and 8b) configurations. Stops 250 (replacing the stop 150) are shown coupled to the lower housing side walls 114, 116, and slides 252 (replacing the slide 152) interact with the stops 250 to limit movement of the front wall 240 relative to the lower housing 110. When the front wall 240 is at the closed configuration in embodiment 200, the ledge 146c interacts with the lower housing 110 as in the embodiment 100. And, when the front wall 240 is at the closed configuration in embodiment 200 and the cover 170 is attached, the hermetic cavity 180 is formed, as in the embodiment 100.

Use of the embodiment 200 is similar to use of the embodiment 100, though the front wall 240 rotates relative to the lower housing 110 instead of sliding relative to the lower housing 110. While the electronic media items 10 in the embodiment 200 are not slid similar to the sliding that may be caused by the movement of the ribs 122 in the embodiment 100, the electronic media items 10 may nevertheless rotate outwardly (in the same general direction as the front wall 140) due to the movement of the front wall 240.

It is understood that while certain forms of this invention have been illustrated and described, it is not limited thereto except insofar as such limitations are included in the following claims and allowable functional equivalents thereof.

The invention claimed is:

1. An electronic media storage apparatus for use in storing a plurality of media items, comprising:
   a lower housing having a floor, first and second opposed side walls extending upwardly from said floor, and a rear wall extending upwardly from said floor and connecting said lower housing opposed side walls; said lower housing opposed side walls each having an outer face, an inner face, and a front face; said rear wall having an outer face; said floor having a front face and an upper surface;
   at least one rib extending from said upper surface of said floor, at least one rib extending from said inner face of said lower housing first side wall, and at least one rib extending upwardly from said inner face of said lower housing second side wall;
   a front wall movable between open and closed configurations; said front wall having first and second opposed ends, outer and inner faces, and a lower face; said front wall having a continuous ledge extending from said front wall inner face; said ledge having a first portion spaced apart from said front wall first end, a second portion spaced apart from said front wall second end, and a third portion spaced apart from said front wall lower face;
   a cover having a top portion, opposed first and second sides extending downwardly from said top portion, and opposed front and rear ends extending downwardly from said top portion and connecting said cover sides; said cover sides and said cover ends each having an outer face and a lower face;
   wherein said lower housing opposed side walls, said lower housing rear wall, and said front wall collectively define a continuous lip at an upper end of said lower housing and an upper end of said front wall when said front wall is at said closed configuration;
   wherein said cover is removably coupled to said lower housing and said front wall; said lower faces of said cover sides and ends resting upon said continuous lip when said front wall is at said closed configuration and said cover is coupled to said lower housing and said front wall;
   wherein, when said front wall is at said closed configuration:
      said front wall inner face abuts said front face of said floor, said front face of said lower housing first side wall, and said front face of said lower housing second side wall;
      said ledge first portion abuts and extends parallel to said lower housing first wall inner face;
      said ledge second portion abuts and extends parallel to said lower housing second wall inner face;
      said ledge third portion abuts and extends parallel to said floor upper surface;
   wherein, when said front wall is at said closed configuration and said cover is coupled to said lower housing and said front wall:
      said outer face of said cover first side is generally coplanar with said outer face of said lower housing first side wall;
      said outer face of said cover second side is generally coplanar with said outer face of said lower housing second side wall;
      said outer face of said cover rear end is generally coplanar with said outer face of said lower housing rear wall;
      said outer face of said cover front end is generally coplanar with said outer face of said front wall;
      a hermetic cavity is formed between said lower housing, said front wall, and said cover; said cavity being sized to receive at least one electronic media item;
   a stop coupled to said lower housing floor and extending upwardly;
   a slide coupled to said front wall that defines a slot having closed ends configured to receive and capture said stop such that said front wall is movable only a predetermined distance relative to said lower housing;
   wherein said front wall slides generally linearly relative to said lower housing when moving between said open and closed configurations; and
   wherein said cavity is sized to receive the plurality of electronic media items.

2. The electronic media storage apparatus of claim 1, wherein said front wall includes a handle extending outwardly from said front wall outer face.

3. The electronic media storage apparatus of claim 2, wherein said floor upper surface is planar.

4. The electronic media storage apparatus of claim 3, wherein:
   said lower housing floor has a lower surface; and
   said cover top portion is parallel to said lower surface of said lower housing floor.

* * * * *